United States Patent [19]
Gasmena

[11] Patent Number: 5,703,178
[45] Date of Patent: Dec. 30, 1997

[54] HEAT ABLATIVE COATING COMPOSITION

[75] Inventor: Roland L. Gasmena, Little Rock, Ark.

[73] Assignee: Ameron International Corporation, Pasadena, Calif.

[21] Appl. No.: 565,112

[22] Filed: Nov. 30, 1995

[51] Int. Cl.$^6$ .................................. C08K 3/20
[52] U.S. Cl. .................. 525/476; 523/404; 523/421; 523/425; 523/179
[58] Field of Search .................. 525/476; 523/404, 523/421, 425, 179

[56] References Cited

U.S. PATENT DOCUMENTS

| | | | |
|---|---|---|---|
| 3,268,359 | 8/1966 | Boyd et al. | 117/132 |
| 3,506,607 | 4/1970 | Bobear | 260/37 |
| 3,623,904 | 11/1971 | Ramseyer | 117/135.1 |
| 3,723,481 | 3/1973 | Bobear | 260/37 |
| 3,755,223 | 8/1973 | Engel | 260/18 PN |
| 3,875,106 | 4/1975 | Lazzaro | 260/37 EP |
| 4,112,179 | 9/1978 | Maccalous et al. | 428/325 |
| 4,212,925 | 7/1980 | Kratel et al. | 428/447 |
| 4,246,423 | 1/1981 | Martin | 556/423 |
| 4,247,330 | 1/1981 | Sanders, Jr. | 106/3 |
| 4,250,074 | 2/1981 | Foscante et al. | 260/32.8 EP |
| 4,581,391 | 4/1986 | Baldwin et al. | 523/179 |
| 4,595,714 | 6/1986 | McAllister et al. | 523/179 |
| 4,600,732 | 7/1986 | Junior et al. | 523/138 |
| 4,656,095 | 4/1987 | MaAllister et al. | 428/413 |
| 5,151,216 | 9/1992 | Liu | 252/307 |
| 5,196,228 | 3/1993 | Kirby et al. | 427/515 |
| 5,212,944 | 5/1993 | Martin et al. | 60/253 |

*Primary Examiner*—Margaret W. Glass
*Attorney, Agent, or Firm*—Christie, Parker & Hale, LLP

[57] ABSTRACT

A heat ablative coating composition is prepared by combining an epoxy silane resin, an epoxy resin, a silicone intermediate, a silicon-modified polyether, an aminosilane, at least one organometallic catalyst, at least one organic solvent, water, at least one filler, optional nonsilicon-containing amine catalyst, and optional pigments and thixotropic agents. The heat ablative coating composition is applied to a substrate to form a film having a build thickness in the range of from about 0.1 to 0.5 inches that is capable of curing at ambient outdoor temperature in about seven days, depending on ambient conditions. The heat ablative film so formed is designed to undergo a slow thermal decomposition when exposed to high temperature conditions without igniting or causing excessive smoke, and is designed to have good thermal conductivity to protect the underlying substrate from thermal decomposition. The heat ablative film has elastomeric properties of impact resistance and flexibility that serves to both protect an underlying structure from mechanical damage due to particle or other contact, and facilitate its use with flexible substrates.

14 Claims, No Drawings

HEAT ABLATIVE COATING COMPOSITION

FIELD OF THE INVENTION

The present invention relates generally to heat ablative coating compositions and, more particularly, to heat ablative coating compositions that are ambient curing and capable of forming an elastomeric film.

BACKGROUND OF THE INVENTION

Heat ablative coatings are useful in applications to protect underlying substrates from both the effects of high-temperature heat exposure, and actual flame contact. Ideally, such coatings form a protective barrier between the heat source and the substrate to minimize the amount of thermal energy that is transferred to the underlying substrate surface. If left unchecked, the thermal energy could cause the substrate to lose physical properties such as yield strength, cause the substrate to ignite, and cause the substrate surface to be oxidized and deteriorate away as a result of such oxidation. Because the underlying substrate is oftentimes an important structural member associated with the heat producing device, such as in the case of a rocket body that houses a rocket engine, or in the case of a launch pad for such a rocket, any possible loss in the physical properties of such structure is undesirable and could prove catastrophic during use.

Conventional methods that are used to protect substrates from the effects of high-temperature heat exposure or flame contact include the use of solid heat tiles, such as those used on the space shuttle, that are applied to the substrate surface using a high-temperature adhesive. The tiles are only effective as long as they remain adhered to the underlying substrate surface, and are known to break away from the substrate surface due to both the differences in thermal expansion characteristics of the substrate and tile, and to the forces acting on the tiles by the high-temperature heat source, i.e., the rocket engine exhaust. Once a tile is removed, the underlying substrate becomes exposed to the harmful high-temperature heat. Further, the use of such tiles does not provide any degree of flexibility and is, therefore, unsuited for use with flexible substrates such as an umbilical cord attached between a rocket and a launch pad.

Other methods that are used to protect substrates from the effects of high-temperature exposure or flame contact include the use of heat ablative coating compositions. Such conventional heat ablative coating compositions are formed from ingredients that cause the coating to ablate, during flame contact or exposure to high temperature, to provide some degree of thermal protection to the underlying substrate. Such heat ablative coatings are applied onto the underlying substrate and are cured to form a heat ablative film.

However, heat ablative films formed from such conventional heat ablative coatings are based on epoxy and polyurethane technology that provide only limited heat resistance of from about 200° F. to 250° F. and are, thus not capable of meeting the demands of protecting an underlying rocket launch pad substrate from temperatures on the order of approximately 5,000° F. for period of at least 10 seconds. Additionally, heat ablative films formed from such conventional epoxy and urethane based coatings offer poor ultraviolet, weather resistance, and acid resistance that cause early chalking, fading and loss of gloss. Further, epoxy and urethane based heat ablative coating compositions form a film that both lacks flexibility, and burns and generates toxic fumes when exposed to high temperature conditions.

Flexibility and impact resistance are desired properties for heat ablative coating used in such applications for purposes of eliminating or minimizing a common cause of film failure, the flaking of the substrate away from the substrate due to flexing of the underlying substrate, or the erosion of film due to film contact by propellent particles during the high-temperature condition, e.g., the launch of a rocket. Flaking away or erosion of the heat ablative film is not desired as this exposes the underlying substrate surface to the high-temperature heat, which could result in fire or loss of mechanical properties.

Additionally, heat ablative films formed from conventional heat ablative coating compositions typically require an elevated temperature cure, i.e., cure above ambient outdoor temperature, or even adherence to a cure process or cycle that involves subjecting the applied coating composition to increasingly elevated temperatures for specified periods of time. The need for elevated temperature cure and/or to adherence to such a cure process makes the use of such heat ablative coatings complicated and time consuming. This is especially true when the substrate being coated is a large structure, such as a launch pad or rocket, requiring that the cure process either be carried out by exposing the entire coated surface to the necessary curing heat in a large oven and the like, or by curing coated sections of the substrate sequentially by using a locally applied heat source.

It is, therefore, desirable that a heat ablative coating composition be prepared that is capable of protecting an underlying substrate from the harmful effects of high-temperature heat. It is desired that the heat ablative coating composition be capable of forming a heat ablative film having elastomeric properties to provide a degree of flexibility and impact resistance. It is desired that the heat ablative coating composition be capable of curing at ambient temperature without the need for an elevated temperature cure or complicated curing cycles. It is also desired that the heat ablative coating form a protective film that has good ultraviolet, weather and acid resistance, and that does not burn or generate toxic fumes when exposed to high temperature conditions.

SUMMARY OF THE INVENTION

There is, therefore, provided in practice of this invention a heat ablative coating composition that is prepared by combining an epoxy and silane functional compound, an epoxy resin, a siloxane, a polyether having silicon modification, an aminosilane, at least one organometallic catalyst, at least one organic solvent, water, at least one filler, optional nonsilicon-containing amine catalyst, and optional pigments and thixotropic agents. The ingredients are combined in two parts, and are packaged and stored in two containers that are mixed together prior to application.

The heat ablative coating composition is applied to form a film having a build thickness in the range of from about 0.1 to 0.5 inches that is capable of curing at ambient outdoor temperature in about seven days, depending on ambient conditions. The heat ablative film so formed is capable of protecting an underlying substrate surface, e.g., a rocket launch pad structure, from the harmful effects of high temperature heat and/or direct flame exposure during a defined time period. The heat ablative film so formed is designed to undergo a slow thermal decomposition without igniting or causing excessive smoke, and is designed to have good thermal conductivity to protect the underlying substrate from thermal decomposition.

The heat ablative film also displays elastomeric properties which provides impact resistance to protect the underlying substrate from mechanical damage that could occur due to particle or other contact, e.g., from aluminum oxide pellets propelled from a rocket. The elastomeric properties of the heat ablative film also provides flexibility to permit the heat ablative coating composition to be used to protect flexible substrates, e.g., an umbilical cord running between a rocket and the launch pad.

These and other features, aspects and advantages of the present invention will become more apparent from the following description and appended claims.

DETAILED DESCRIPTION

This invention relates to heat ablative coating compositions that are capable of curing at ambient temperature to provide a cured film having heat ablative and elastomeric properties of flexibility and impact resistance. Heat ablative coating compositions are prepared, according to principles of this invention, by combining, in the presence of a sufficient amount of water to effect hydrolysis and polycondensation:

a. an epoxy functional silane compound; with
b. a siloxane;
c. a silicon containing polyether;
d. an aminosilane;
e. an epoxy resin;
f. an optional amine catalyst;
g. an organometallic catalyst;
h. at least one organic solvent;
I. at least one filler; and
j. optional pigments and/or thixotropic agents and the like.

The ingredients are combined together and undergo hydrolysis, polycondensation, homopolymerization, and heteropolymerization reactions to produce both crosslinking and an interpenentrating network of the resins that form an elastomeric, ambient curing, heat ablative film.

With respect to the epoxy functional silane compound, suitable epoxy functional silane compounds include those having the general formula

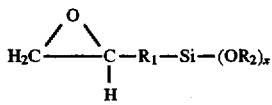

having one or more oxirane rings, where $R_1$ is selected from the group consisting of hydrocarbons having in the range of from about one to six carbon atoms, where $R_2$ is preferably a saturated hydrocarbon having in the range of from about one to three carbon atoms, where each $R_1$ can be the same or different, and where x is equal to three. It is desired that the $R_2$ groups be limited to about three carbon atoms to limit the effect of steric hindrance that such groups could cause during hydrolysis and polycondensation reactions, which could reduce the rate of such reactions and ultimately lengthen the time to achieve cure.

A preferred epoxy functional silane compound is an epoxy and alkoxysilane functional compound where the $R_1$ group is an oxyalkyl group and the $R_2$ groups are methyl groups to facilitate fast cure. A particularly preferred epoxy functional silane compound is gamma-glycidoxyproyltrimethoxysilane that is commercially available from, for example, OSI Specialties of Terrytown, N.Y. under the product name OSI A-187.

The epoxy functional silane compound is used to both enhance the intercoat and substrate adhesion of the coating, and to improve the flexibility of the cured coating. A preferred heat ablative coating composition is formed by using in the range of from about 0.5 to 5 percent by weight of the epoxy functional silane compound. A coating composition prepared by using less than about 0.5 percent of the epoxy functional silane compound will have reduced intercoat and substrate adhesion properties, and have reduced film integrity. A coating composition prepared by using more than about five percent by weight of the silane compound will be economically undesirable as the added silane compound does not appreciably improve coating adhesion or cured coating flexibility. A particularly preferred heat ablative coating is prepared using approximately one percent by weight of the epoxy functional silane compound.

With respect to the siloxane ingredient, suitable siloxane include those having the general formula

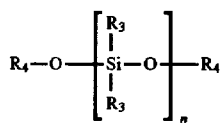

where each $R_3$ is selected from the group consisting of an hydroxy group, and alkyl, aryl and alkoxy groups having in the range of from about one to six carbon atoms, where each $R_3$ group can be the same or different, where each $R_4$ is selected from the group consisting of hydrogen, and alkyl and aryl groups having in the range of from about one to six carbon atoms, where each $R_4$ group can be the same or different, and where n is selected so that the siloxane has an average molecular weight in the range of from about 500 to 3,500. It is desired that carbon-containing groups selected for the $R_3$ and $R_4$ groups have less than about six carbon atoms to limit effects of steric hindrance during hydrolysis and polycondensation reactions and, thereby reduce cure time. The siloxane is used to provide heat and fire resistance to the coating composition.

A preferred siloxane is one where the $R_3$ groups are each methoxy groups to facilitate rapid cure by formation of relatively volatile alcohol analogs, and where the $R_4$ groups are each phenyl groups. A particularly preferred siloxane is diphenyl-methylmethoxy silicone that is commercially available from, for example, Dow Corning Corp of Midland, Mich. under the product name DC-3074; and Wacker of Adrain, Mich. under the product name SY-231.

A preferred heat ablative coating composition is formed by using in the range of from about 0.5 to 5 percent by weight of the siloxane. A coating composition prepared by using less than about 0.5 percent by weight of the siloxane will form a cured film having reduced heat and flame resistance. A coating composition prepared by using more than about five percent by weight of the siloxane is economically undesirable as the added siloxane does not appreciably improve heat or flame resistance of the cured film, and will form a cured film having increased hardness, decreased flexibility, and a decreased rate of heat ablation. A particularly preferred heat ablative coating is prepared using approximately two percent by weight of the siloxane.

With respect to the silicon containing polyether, suitable silicon containing polyethers useful in preparing the heat ablative coating composition include those represented by the general formula

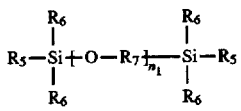

where each $R_5$ can be selected from the group of saturated hydrocarbons having in the range of from one to six carbon atoms, where each $R_5$ can be the same or different, where each $R_6$ can be an alkoxy group having in the range of from one to three carbon atoms, where each $R_6$ can be the same or different, where $R_7$ can be selected from the group of saturated or unsaturated hydrocarbons having in the range of from about one to twelve carbon atoms, and where $n_1$ is selected so that the silicon-modified polyether has an average molecular weight in the range of from about 250 to 5,000. It is desired that the number of carbon atoms for the $R_5$ and $R_6$ groups each be limited to reduce the effects of steric hindrance during hydrolysis and polycondensation reactions and, thereby facilitate rapid cure.

A preferred silicon containing polyether is one where the $R_5$ groups are each methyl groups, the $R_6$ groups are each methoxy groups, the $R_7$ group is propylene, and where $n_1$ is selected so that A particularly preferred silicon containing polyether is one commercially available from, for example, Kaneka of Japan under the Silmod series of products.

The silicon containing polyether is used to prepare the coating composition because it provides flexibility, elongation, abrasion resistance, increased heat ablation resistance, and improved film integrity to the cured film. A preferred heat ablative coating composition is formed by using in the range of from about 20 to 45 percent by weight of the polyether. A coating composition prepared by using less than about 20 percent by weight of the polyether will form a cured film having reduced properties of heat ablation resistance, flexibility, elongation, and heat and fire resistance. A coating composition prepared by using more than about 45 percent by weight of the polyether will produce a film having a slow cure time, poor film integrity, poor adhesion, and reduced heat and fire resistance. A particularly preferred heat ablative coating is prepared using approximately 35 percent by weight of the silicon containing polyether.

With respect to the aminosilane, suitable aminosilanes useful in preparing the heat ablative coating composition include those having the general formula

where $R_8$ is selected from the group consisting of saturated or unsaturated hydrocarbon groups comprising in the range of from 1 to 18 carbon atoms, where $R_9$ is selected from the group consisting of alkyl, aryl, and alkoxy groups having in the range of from one to six carbon atoms, where $n_2$ is in the range of from one to three, and where $n_3$ is equal one to three. Preferred aminosilanes include those where $n_2$ is equal to two, where $R_9$ is a methyl group, and where $n_3$ is equal to three. It is desired that $R_8$ be limited to less than about 18 carbon atoms to limit the viscosity of the aminosilane to an acceptable level, and that $R_9$ be limited to less than about six carbon atoms to limit the effect of steric hindrance to facilitate rapid cure.

A particularly preferred aminosilane is N-beta-aminoethyl-gamma-aminopropyltrimethoxysilane that is commercially available from, for example, OSI Specialties under the product name A-1120. Other suitable aminosilanes includes those available from, for example, Dow Corning under the product name DC-Z6020, and Union Carbide of New York, N.Y. under the A-1100 product series. The aminosilane acts as a catalyst and as a cross linker for the formation of Si—O—Si bonds between the silicone intermediate and the silane monomers, and also serves as the reactive component to form epoxy-amine bonds. Therefore, the amount of aminosilane used to prepare the coating composition is a stoichiometric amount of aminosilane based on the total epoxy, present as epoxy silane and epoxy resin, and total amine, present as aminosilane and amine catalyst, equivalence.

A coating composition prepared by using less than a amount of aminosilane will form a film having increased cure time with poor film integrity. A coating composition prepared by using more than a stoichiometric amount of the aminosilane will produce a film having limited pot life. A particularly preferred heat ablative coating is prepared using approximately one percent by weight of the aminosilane, based on the use of approximately one percent by weight epoxy silane, eight percent by weight epoxy resin, and one percent by weight amine catalyst.

With respect to the epoxy resin, suitable epoxy resins useful in forming the heat ablative coating composition are nonsilicon-containing epoxy resins including those comprising at least two oxirane groups, which may be aliphatic or aromatic, and which may further comprise some monomers. Preferred epoxy resins are glycidal-type epoxy resins. A particularly preferred epoxy resin is a modified resorcinol epoxy resin; specifically, modified di-glycidal ether Bisphenol F-resorcinal formaldehyde that is available commercially from, for example, CVC Specialty Chemicals of Cherry Hill, N.J. under the produce name Erisys RF-50. The epoxy resin provides film integrity, film tear strength, and adhesive and cohesive properties.

A preferred heat ablative coating composition is formed by using in the range of from about 1 to 20 percent by weight of the epoxy resin. A coating composition prepared by using less than about one percent by weight of the epoxy resin will form a film having reduced film elongation, reduced flexibility, and increased cure time. A coating composition prepared by using more than about 20 percent by weight of the epoxy resin will produce a film having reduced flexibility and reduced heat ablation resistance. A particularly preferred heat ablative coating is prepared using approximately eight percent by weight of the epoxy resin.

With respect to the amine catalyst, suitable amine catalysts include tertiary amines having the general formula

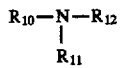

where $R_{10}$ is selected from the group consisting of hydrogen, and aryl, alkyl, alkyaryl and cyclooxyalkyl groups having from 1 to 12 carbon atoms, where $R_{11}$ is selected from the group consisting of hydrogen, and aryl, alkyl, alkyaryl and cyclooxyalkyl groups having from 1 to 12 carbon atoms, and where $R_{12}$ is selected from the group consisting of alkyl, aryl, alkyaryl, cyclooxyalkyl and hydroxyalkyl groups having from 1 to 12 carbon atoms.

Preferred amine catalysts include dimethyl methanolamine, dimethyl ethanolamine, dimethyl propanolamine, dimethyl butanolamine, dimethyl pentanolamine, dimethyl hexanolamine, methyl ethyl methanolamine, methyl propyl methanolamine, methyl ethyl ethanolamine, methyl ethyl propanolamine, mono isopropanolamine, methyl diethanolamine, triethanolamine, diethanolamine, ethanolamine. A particularly preferred amine catalyst is tri-2-ethylhexoate commercially available from, for example, Air Products of Pennsylvania under the product name Ancamine K-54.

The amine catalyst acts, like the aminosilane, as a catalyst and cross linker for the formation of Si—O—Si bonds between the silicone intermediate and silane monomers, serves as the reactive components to for the epoxy-amine bonds and, unlike the aminosilane, catalyzes homopolymerization of the epoxy groups. The amine catalyst is optional and is not essential for achieving ambient temperature cure. However, the amine catalyst does act to speed up cure.

A preferred heat ablative coating composition is formed by using up to about five percent by weight of the amine catalyst. A coating composition prepared without using the amine catalyst will form a film having an increased cure time. A coating composition prepared by using more than about five percent by weight of the amine catalyst will produce a film having a reduced pot life, and a loss of flexibility. A particularly preferred heat ablative coating is prepared using approximately one percent by weight of the amine catalyst.

With respect to the organometallic catalyst, preferred organometallic catalysts include organotin compounds having the general formula

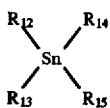

where $R_{13}$, $R_{14}$, $R_{15}$, and $R_{16}$ are each selected from the group consisting of alkyl, aryl, and alkoxy groups having from 1 to 12 carbon atoms, and where any two of $R_{13}$, $R_{14}$, $R_{15}$, and $R_{16}$ are also selected from a group consisting of inorganic atoms including halogens, sulphur or oxygen.

Organotin compounds useful as catalysts include tetramethyltin, tetrabutyltin, tetraoctyltin, tributyltin chloride, tributyltin methacrylate, dibutyltin dichloride, dibutyltin oxide, dibutyltin sulfide, dibutyltin acetate, dibutyltin dilaurate, dibutyltin maleate polymer, dibutyltin dilaurylmercaptide, tin octoate, dibutyltin bis (isooctylthioglycolate), butyltin trichloride, butylstannoic acid, dioctyltin dichloride, dioctyltin oxide, dioctyltin dilaurate, dioctyltin maleate polymer, dioctyltin bis (isooctylthioglycolate) dioctyltin sulfide, dibutyltin 3-mercapto propionate). Other suitable organometallic catalysts include organozinc compounds.

A particularly preferred organometallic catalyst is dibutyltin diacetyl acetonate that is commercially available from, for example, Kaneka of Japan under the Product name UA-220. A preferred coating composition is prepared using a blend of organotin and organozinc compounds comprising dibutyltin diacetyl acetonate and zinc octoate.

The organometallic catalyst(s) is used to promote hydrolysis and condensation of the silanes in the presence of amines. The organotin compounds, in particular, are useful for initiating such hydrolysis and condensation reactions, which the organozinc compounds are useful for driving the reactions to completion. A preferred heat ablative coating composition is comprises in the range of from 0.5 to 5 percent by weight of the organometallic catalyst(s). A coating composition prepared by using less than about the preferred amount of the organometallic catalyst(s) will form a heat ablative film having an increased cure time. A coating composition prepared by using more than that desired amount of the organometallic catalyst(s) will produce a cured film having reduced heat and flame resistance.

A particularly preferred heat ablative coating is prepared using a blend of an organotin compound and an organozinc compound to both initiate hydrolysis and condensation, and drive the reactions to completion. A particularly preferred catalyst blend comprises approximately 0.3 percent by weight of the organotin compound, and approximately 0.1 percent by weight of the organozinc compound.

With respect to water useful in preparing the heat ablative coating composition, it is desired that a sufficient amount, i.e., a stoichiometric amount, of water be present as added deionized water to promote hydrolysis of the epoxy silane and silicone intermediate. Additionally, after the coating composition has been applied to a desired substrate, atmospheric water or moisture is needed to complete the curing of the coating to form a heat ablative film. A preferred heat ablative coating composition comprises in the range of from 0.1 to 2 percent added water by weight of the total composition. A coating composition prepared by using less than about 0.1 percent by weight of water will form a heat ablative film that will not cure properly. A coating composition prepared by using more than about two percent by weight of water will produce a gel or firm solid. A particularly preferred heat ablative coating is prepared using approximately 0.5 percent by weight water.

With respect to solvents useful in preparing heat ablative coating compositions of this invention, suitable solvents include conventional organic solvents such as alcohols, glycolic acetates, ethers, esters, aromatics and the like. Specific solvents include, for example, MEK, MIBK, n-propyl ketone, methyl isoamyl ketone, methyl amyl ketone, isobutyl acetate, butyl acetate, ethyl-3-ethoxy propionate, xylene and higher boiling aromatic solvents such as glycidal ether acetate, hexyl acetate, heptyl acetate and the like. The solvent ingredient can either be a single type of solvent or can be a blend of two or more types of solvent. A preferred coating composition is one prepared by using a blend of solvents. A particularly preferred blend of solvents is one formed by combining xylene and glycidal ether acetate.

The solvent ingredient is used to both facilitate blending together the resins and the fillers, and to reduce viscosity to facilitate coating application. A heat ablative coating composition comprises in the range of from 5 to 20 percent by weight solvent(s). Using less than the preferred amount of solvent(s) will produce a coating that is not well mixed, which will result in forming a film having poor film integrity. Using more than the preferred amount of solvent(s) will form a coating composition having a film building capability less than that desired to serve as a heat ablative film. A particularly preferred coating composition comprises a blend approximately 12 percent by weight of solvents formed from a blend of xylene, glycidal ether acetate and methanol.

With respect to fillers, suitable fillers useful in preparing a heat ablative coating composition include silica powder, ceramic fibers, talc (magnesium silicate), clays such as china clay (aluminum silicate), wollastonite (calcium silicate), calcium carbonate, barites (barium sulfate, barium metaborate), aluminum trihydrate, graphite, zinc, aluminum, copper and the like. Preferred fillers include finally divided particulates such as barites (barium sulfate), clay, ceramics, mica, micaceous iron oxide, aluminum flake, glass flake, stainless steel flake, and the like.

Fillers are useful for producing structural support for the film to facilitate high film build. It is desired that heat ablative films formed from coating compositions of this invention have a film build thickness in the range of from about 0.1 to 0.5 inches. Films of thickness are desired because they have been shown to be most effective at protecting an underlying structure from harmful heat and/of flame contact under conditions of rapid temperature increase, such as in a launch pad application, from ambient outdoor temperature to a temperature of approximately 5,000° F. during a period of approximately ten seconds.

Preferred fillers include those that are fire and smoke retardant when exposes to high temperature or direct flame contact. Coating compositions of this invention may comprise a single type of filler or a blend of different fillers, depending on the desired film properties for a specific application. For example, for use as a heat ablative launch pad coating, the coating composition is prepared using a blend of clay, talc and ceramic fiber fillers.

A preferred heat ablative coating composition comprises in the range of from 10 to 35 percent by weight filler(s). A coating composition prepared by using less that about 10 percent by weight filler(s) will form a cured film having a reduced degree of build thickness, flame, and smoke retardation for use as a heat ablative coating. A coating composition prepared by using more than about 35 percent by weight of filler(s) will produce a cured film having poor film integrity and poor application properties. A particularly preferred coating composition comprises approximately 25 percent by weight filler(s) made up of a blend of clay, talc and ceramic fiber fillers.

Pigments such as iron oxide, aluminum oxide, titanium dioxide, chrome green and the like may also be used. Pigments containing lead should be avoided because of interference with cure. Organic pigments such as hansa yellow, phthalo green, and phthalo blue may also be used to color the product. Zinc oxide can also be used to aid film hardening.

The coating composition can be prepared using a single type of pigment, or by using a blend of more than one pigment, depending on the particular application. A preferred heat ablative coating composition may comprise up to about 15 percent by weight pigment(s). A particularly preferred coating composition comprises approximately eight percent by weight pigment(s).

Coating compositions prepared according to principles of this invention can also include additives such as pigment wetting agents, surfactants, defoamers, flow control agents, thixotropes and UV stabilizers as well plasticizers. A coating composition may comprise up to about percent by weight additives. A preferred coating composition may comprises up to about two percent by weight additives. A particularly preferred coating composition comprises approximately 0.5 percent by weight additives.

The heat ablative coating composition is prepared and stored as a two-part system by combining the epoxy functional silane compound, epoxy resin, siloxane, organometallic catalyst(s), water, a portion of the organic solvent(s), optional pigment(s), a portion of the filler(s), and a portion of the additive(s) together in a first container to form a first part. The silicon containing polyether, aminosilane, amine catalyst, remaining filler(s), remaining organic solvent(s), and remaining additive(s) are combined together in a second container to form a second part. Prior to application, the contents of the first and second containers are combined and mixed together to form the heat ablative coating composition.

While not wishing to be bound by any particular theory or mechanism, it is believed that the heat ablative coating composition is formed by hydrolytic polycondensation of the silicones and silanes, catalyzed by the amines and the organometallic catalyst in the presence of water. Simultaneously, homopolymerization and heteropolymerization of the epoxy occurs due to the presence of the amine catalyst and the aminosilane. The simultaneous reactions produce both a crosslinking and interpenetrating network of the resins to form an elastomeric, ambient curing, heat ablative film.

The coating composition can be applied by conventional application techniques, such as by brush, roll or spray. Use of one or more traditional organic solvents can be used to dilute the coating to facilitate spray application. Exemplary solvents which can be used are the same as those previously described for preparing the coating composition. If desired, up to 50 percent by weight of the solvent can be used based on the combined weight of the solvent and coating composition. Preferably, in the range of from about 10 to 20 percent by weight of the organic solvent is used to conform to governmental regulations that govern the extent of volatile organic compound emissions. A particularly preferred spray applicable coating composition is formed by using approximately 12 percent by weight of the organic solvent based on the total weight of the combined solvent and coating composition.

A key feature of coating compositions, prepared according to principles of this invention, is the ability to cure at ambient temperature to form a heat ablative film on a variety of structural substrates such as those formed from concrete, metal and the like. In a preferred embodiment, after the ingredients are combined together and applied to a desired substrate, the applied coating composition cures in the range of from about 5 to 12 days, depending on such factors as the ambient temperature condition, relative humidity, ultraviolet exposure, film thickness, wind conditions and the like. In one example, the coating composition of this invention, after being applied to a metal substrate, is capable of being completely cured in approximately seven days at an ambient temperature of approximately 70° F. The coating composition of this invention can be applied to cure at ambient outdoor temperatures in the range of from about 50° F. to 120° F.

Another key feature of coating compositions, prepared according to principles of this invention, is that the resulting heat ablative films produced are capable of protecting an underlying substrate surface from harmful effects of high temperature heat and/or direct flame contact for a defined period of time. For example, when applied to the structure of a rocket launch pad used for launching space vessels, missiles and the like, the heat ablative film acts to protect the underlying metal and/or concrete structure from the high temperature heat and flame produced by the vessel or missile rocket engine(s). Under such conditions, the heat ablative film is exposed to a rapid temperature increase at launch from ambient outdoor temperature to temperatures as high as 5,000° F. during a brief period of at least ten seconds.

During such exposure to extreme temperatures, the heat ablative film is designed to undergo a slow thermal decomposition without igniting or causing excessive smoke, and has good thermal conductivity to protect the underlying substrate from thermal decomposition. Unlike conventional protective coatings formed from nonsilicon-based epoxy and urethan compositions, heat ablatives coatings of this invention are not combustible and do not generate toxic fumes. In such an example application, the heat ablative film is designed to keep the underlying substrate at a temperature below about 150° F.

Another key feature of coating compositions, prepared according to principles of this invention, is that the resulting heat ablative film is elastomeric and, thus provides a degree of impact resistance and can be used to protect flexible substrates. In an example application on a launch pad, the heat ablative film acts to protect the underlying substrate from mechanical damage known to occur from aluminum oxide pellets propelled from the rocket. The heat ablative film is also used to protect flexible substrates, such as the umbilical cord used between the launch pad and vessel, from the destructive effects of heat and flame exposure during launch.

Another key feature of heat ablative coating compositions of this invention is that they provide excellent ultraviolet, weather and acid resistance when compared to conventional nonsilicon-based epoxy and urethane coatings.

A heat ablative coating composition was prepared for use on a launch pad for space vessels, rockets and the like according to the following example.

EXAMPLE

A first part of a heat ablative coating composition was prepared by combining approximately 2 grams(g) of the epoxy functional silane compound, 7.6 grams of xylene, 15 g of the epoxy resin, 3.4 g of the siloxane, 0.6 g of the organotin compound, and 0.3 g of the organozinc compound and mixing the ingredients together until uniform. To such first part ingredients were added 12 g clay filler, 0.8 g methanol, 2.7 g glycol ether acetate, 13.3 g titanium dioxide pigment, 2.3 g black oxide pigment, 12 g talc filler, 18 g ceramic fiber filler, 0.9 g deionized water, 8.4 g xylene, and 0.3 thixotropic agent. The first part ingredients were mixed together at room temperature until uniform.

A second part of the heat ablative coating composition was prepared by combining approximately 66 g silicon containing polyether, 0.6 g thixotropic agent, 5 g ceramic fiber filler, 16 g clay filler and mixing the ingredients together until uniform. To such second part ingredients were added 7.6 g xylene, 2.4 g aminosilane, and 2.4 g amine catalyst. The second part ingredients were mixed together at room temperature until uniform.

A heat ablative coating composition was prepared by combining the first and second part ingredients together and mixing the combined ingredients at room temperature until uniform. The heat ablative coating composition prepared according to this example is capable of being applied at a film thickness in the range of from 0.1 to 0.5 inches, of completely curing in approximately seven days at an ambient temperature of approximately 70° F., and protecting the underlying substrate from exposure to temperatures as high as approximately 5,000° F. for a period of about ten seconds.

Although but a single example of heat ablative coating compositions according to this invention has been described, many variations will be apparent to those skilled in the art. Since many such variations may be made, it is to be understood that within the scope of the following claims, this invention may be practiced otherwise than specifically described.

What is claimed is:

1. An ambient-curing heat ablative coating composition prepared by combining:
   an epoxy functional silane compound;
   a nonsilicon-containing epoxy resin;
   a siloxane;
   a silicon containing polyether;
   an aminosilane;
   at least one organometallic catalyst;
   at least one organic solvent;
   water; and
   at least one filler.

2. A heat ablative coating composition as recited in claim 1 wherein the epoxy functional silane compound has the formula

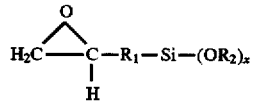

where $R_1$ is selected from the group consisting of hydrocarbons having in the range of from about one to six carbon atoms, where $R_2$ is selected from the group consisting of saturated hydrocarbons having in the range of from about one to three carbon atoms, and where x is equal to three.

3. A heat ablative coating composition as recited in claim 1 wherein the organometallic catalyst comprises a mixture of organotin and organozinc compounds.

4. A heat ablative coating composition as recited in claim 1 further comprising a nonsilicon-containing amine catalyst.

5. A heat ablative coating composition as recited in claim 4 wherein the amine catalyst is a tertiary amine having the formula

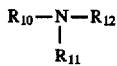

where $R_{10}$ is selected from the group consisting of hydrogen, and aryl, alkyl, alkyaryl and cyclooxyalkyl groups having from 1 to 12 carbon atoms, where $R_{11}$ is selected from the group consisting of hydrogen, and aryl, alkyl, alkyaryl and cyclooxyalkyl groups having from 1 to 12 carbon atoms, and where $R_{12}$ is selected from the group consisting of alkyl, aryl, alkyaryl, cyclooxyalkyl and hydroxyalkyl groups having from 1 to 12 carbon atoms.

6. A heat ablative coating composition as recited in claim 1 wherein the filler comprises a mixture of clay, talc, and ceramic fiber fillers.

7. A heat ablative coating composition as recited in claim 1 comprising in the range of from 0.5 to 5 percent by weight epoxy functional silane compound, 1 to 20 percent by weight nonsilicon-containing epoxy resin, 0.5 to 5 percent by weight siloxane, 20 to 45 percent by weight silicon containing polyether, a stoichiometric amount of aminosilane based on epoxy and amine equivalence, 0.5 to 5 percent by weight organometallic catalyst, 5 to 20 percent by weight organic solvent, 10 to 35 percent by weight filler, and 0.1 to 2 percent by weight water based on the total weight of the composition.

8. A heat ablative coating composition as recited in claim 1 comprising in the range of from 20 to 45 percent by weight of the silicon containing polyether based on a total weight of the composition.

9. A heat ablative coating composition as recited in claim 1 comprising in the range of from 0.5 to 5 percent by weight epoxy functional silane compound, 1 to 20 percent by weight nonsilicon-containing epoxy, 0.5 to 5 percent by weight siloxane, and 10 to 35 percent by weight fillers based on a total weight of the composition.

10. A heat ablative coating composition as recited in claim 1 comprising a mixture of organometallic catalysts comprising organotin compounds and organozinc compounds.

11. A heat ablative coating composition as recited in claim 10 comprising in the range of from 0.5 to 5 percent by weight organometallic catalysts based on a total weight of the composition.

12. A heat ablative coating composition as recited in claim 1 wherein the aminosilane has the formula $$(NH_2)_{n_2}\text{-}R_8\text{-}Si\text{-}(OR_9)_{n_3}$$

where $R_8$ is selected from the group consisting of saturated or unsaturated hydrocarbon groups comprising in the range of from 1 to 18 carbon atoms, where $R_9$ is selected from the group consisting of alkyl, aryl, and alkoxy groups having in the range of from one to six carbon atoms, where $n_2$ is in the range of from one to three, and where $n_3$ is equal to three.

13. A method for preparing an ambient-curing heat ablative coating composition comprising the steps of:
  combining together:
    an epoxy functional silane compound;
    nonsilicon-containing epoxy resin;
    at least one siloxane;
    at least one organometallic catalyst;
    water;
    at least one organic solvent; and
    at least one filler to form a first mixture;
  combining together:
    a silicon containing polyether;
    an aminosilane;
    at least one filler; and
    at least one organic solvent to form a second mixture; and
  mixing the first and second mixtures together.

14. An ambient-curing heat ablative coating composition prepared by combining:
  an epoxy and alkoxysilane functional compound;
  a nonsilicon-containing epoxy resin having at least two oxirane groups;
  an alkoxy-functional siloxane;
  a silicon containing polyether
  an aminosilane;
  at least one organometallic catalyst;
  an amine catalyst;
  at least one organic solvent;
  water; and
  at least one filler.

* * * * *